(12) United States Patent
Su

(10) Patent No.: US 7,411,783 B2
(45) Date of Patent: Aug. 12, 2008

(54) COMPUTER DC POWER SOURCE OUTPUT DEVICE

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 0 days.

(21) Appl. No.: 11/414,201

(22) Filed: May 1, 2006

(65) Prior Publication Data

US 2007/0253152 A1    Nov. 1, 2007

(51) Int. Cl.
*G06G 1/16*    (2006.01)

(52) U.S. Cl. .................. 361/683; 361/684; 361/686; 361/824; 710/62

(58) Field of Classification Search ......... 361/679–683, 361/686, 724–727, 784, 797; 312/223.1, 312/223.2; 710/62–65
See application file for complete search history.

(56) References Cited

U.S. PATENT DOCUMENTS

| | | | | |
|---|---|---|---|---|
| 5,737,190 A | * | 4/1998 | Marshall et al. ............. | 361/760 |
| 5,807,140 A | * | 9/1998 | Hopkins ..................... | 439/638 |
| 5,870,615 A | * | 2/1999 | Bar-On et al. ............... | 713/310 |
| 6,098,127 A | * | 8/2000 | Kwang ........................ | 710/62 |
| 6,362,610 B1 | * | 3/2002 | Yang .......................... | 323/281 |
| 6,504,343 B1 | * | 1/2003 | Chang ........................ | 320/124 |
| 7,133,293 B2 | * | 11/2006 | Fiorentino et al. .......... | 361/752 |
| 7,198,512 B1 | * | 4/2007 | Swiatek ...................... | 439/501 |
| 2001/0046123 A1 | * | 11/2001 | Wedding .................... | 361/727 |
| 2004/0204177 A1 | * | 10/2004 | Pon ............................ | 455/573 |
| 2005/0168936 A1 | * | 8/2005 | Sharma et al. .............. | 361/686 |
| 2007/0168125 A1 | * | 7/2007 | Petrik ......................... | 701/213 |

* cited by examiner

*Primary Examiner*—Jayprakash N Gandhi
*Assistant Examiner*—Anthony Q. Edwards
(74) *Attorney, Agent, or Firm*—Troxell Law Office, PLLC

(57) ABSTRACT

The present invention relates to a computer device, allowing different direct current output power sources from the computer power supplies to be connected to a computer panel, housing or hard disk rack so as to provide or make use of power for external computer peripherals.

2 Claims, 8 Drawing Sheets

COMPUTER DC POWER SOURCE OUTPUT DEVICE

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of the Invention

The present invention provides a computer direct current power source output device capable of connecting a computer power supply's direct current to a computer panel, housing, or hard disk rack, for supplying power to the computer's peripheral devices or allowing them to use direct current. The structure allows for an output circuit board to be affixed on the computer's hard disk rack, panel or housing, and provided thereon is an output circuit board with various output ends, and allow it to be electrically connected to the computer power supply's direct current power output end. As a result, the user can charge or use direct current for computer related peripheral devices.

2. Background of the Invention

In the rapid development of the computer, people have benefited by the revolutionary improvements has brought about, thereby changing the ways people handle things. In particular because of the expansion of the functions that computers can provide, peripheral devices with heterogonous functions, such as printers, scanners, external hard disks, hubs, card readers, digital cameras, speakers, web conferencing, wireless keyboards, wireless mice and cell phone recharge devices can work together with computers.

However, most computer peripheral devices need a power supply, especially direct current power, to operate at the required power. As known by those with industry knowledge, the way most of the above computer peripheral devices obtain power is by connecting one end of the connecting power cable to an AC power plug via a transformer, and change AC to DC via the transformer so as to provide the required power for the devices. Therefore, the AC power cable connectors require numerous transformers or plugs. The power cables connecting to each peripheral device will also be difficult to manage.

In view of the disadvantages of the above conventional power supplies, the inventor has developed the present invention through accumulated product development experience in computer related fields of expertise. The present invention is characterized in that the direct current output power of the computer power supply is connected to a computer panel, a housing, or a hard disk rack so as to recharge external computer peripheral devices or to make use of the direct current for the computer devices. The output circuit board with various output ends provided thereon can also be assembled with a hard disk rack or a panel, and be affixed on a computer hard disk rack, a panel or a housing. As a result, the user can connect the computer related peripheral devices with the output panel so as to recharge the computer related peripheral devices or make use of the direct current power.

SUMMARY OF THE INVENTION

As shown in FIG. 1, the present invention's computer direct current power output device mainly includes an output circuit board 1. The front surface of the output circuit board 1 is provided with a variety of output ends, such as USB output end 11, SATA output end 12, 4P output end 13, output end with different current value 14, 14', 14", and a cigarette ignition output end 15.

The rear surface of the output circuit board 1 is provided with a connecting end 16. The connecting end 16 can be connected with a corresponding connecting end 2 of the computer power supply output, such that the various output ends of the above output circuit board 1 can be provided with direct current as needed.

As shown in FIGS. 2, 3 and 4, the output circuit board 1 is affixed on the front edge of an auxiliary panel 3 so as to be directly affixed on an appropriate upper or side place on a panel 71 or housing 72 of a computer host 7, such that a user can be connected through the output end of the output circuit board 1 and charge the computer related peripherals or make use of the direct current.

DETAILED DESCRIPTION OF THE EMBODIMENTS

Figure 1:
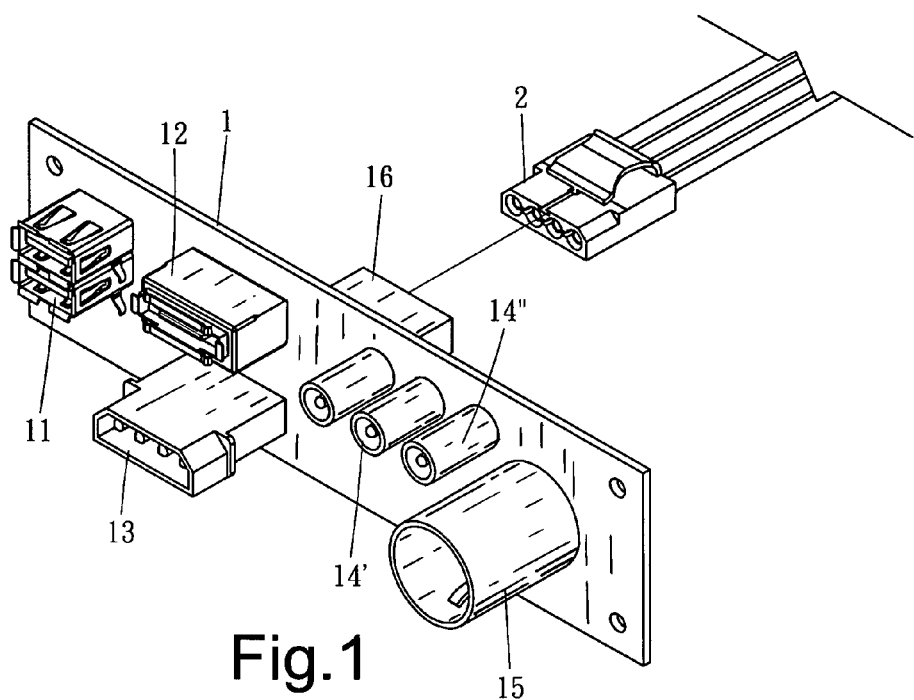
FIG. 1 is a three-dimensional view of an output circuit board in accordance with the present invention.
Figure 2:
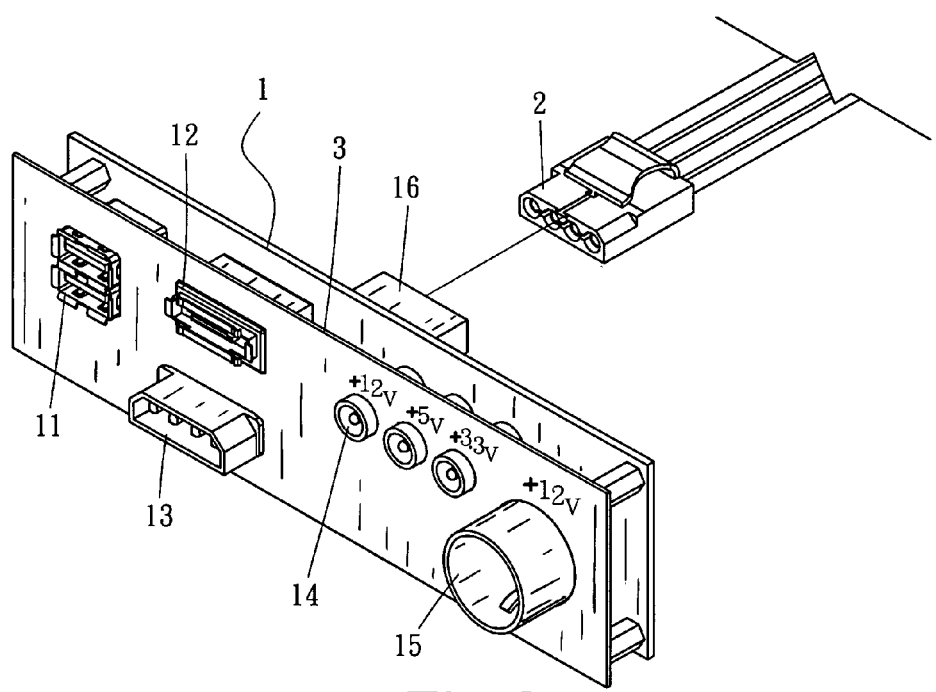
FIG. 2 is a three-dimensional view of the output circuit board affixed on auxiliary panel in accordance with the present invention.
Figure 3:
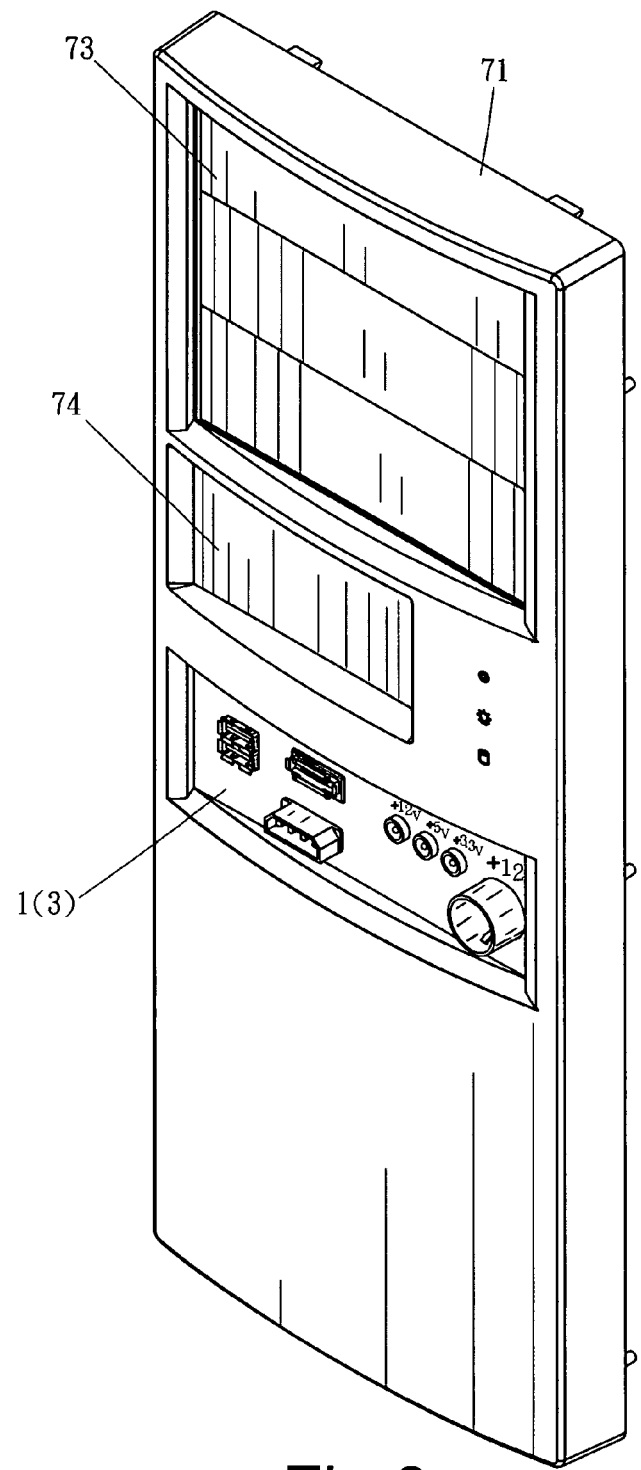
FIG. 3 is a three-dimensional view of the output circuit board affixed on a computer panel along with the auxiliary panel in accordance with the present invention.
Figure 4:
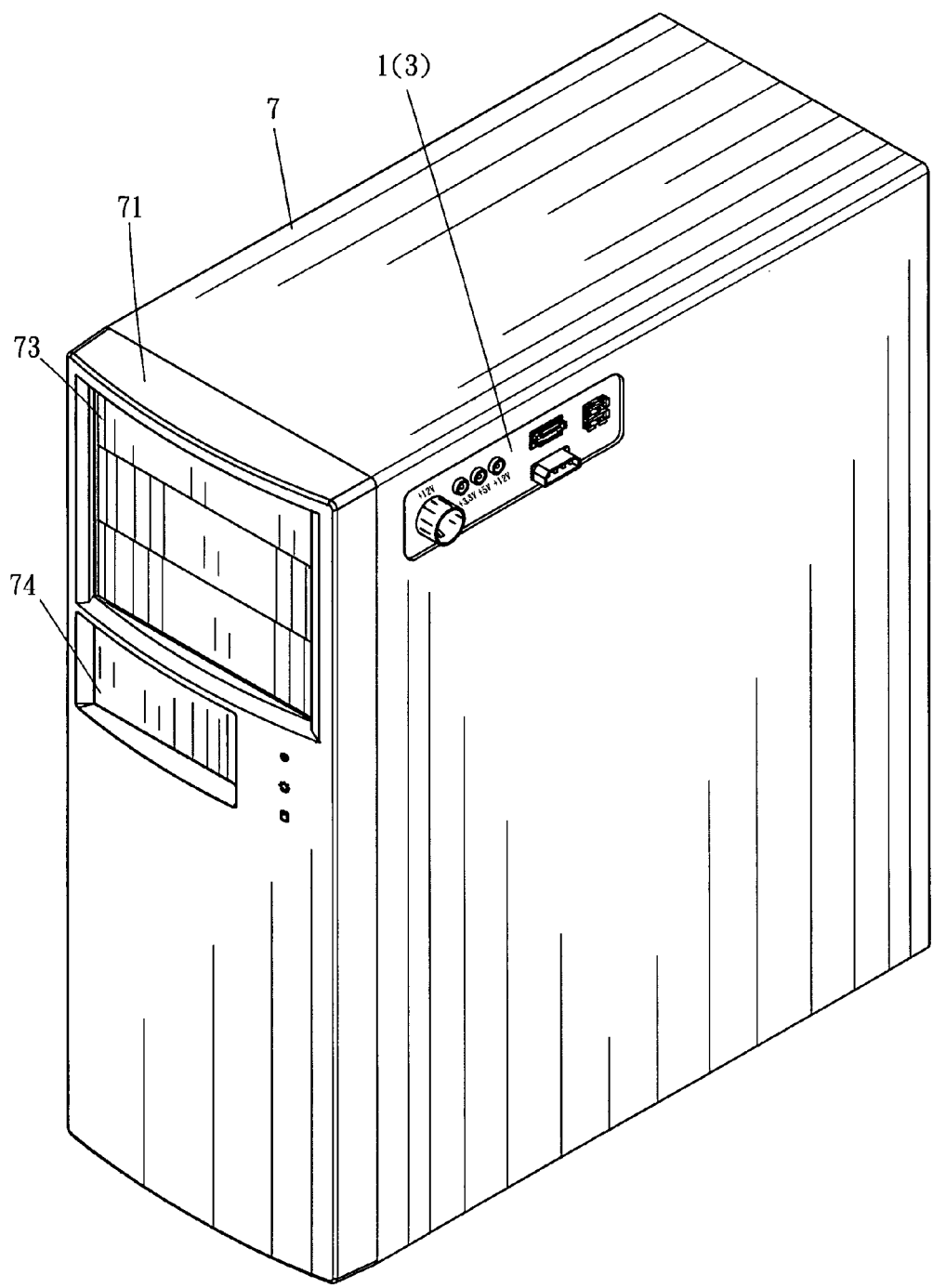
FIG. 4 is a three-dimensional view of the output circuit board affixed on a computer housing along with the auxiliary panel in accordance with the present invention.
Figure 5:
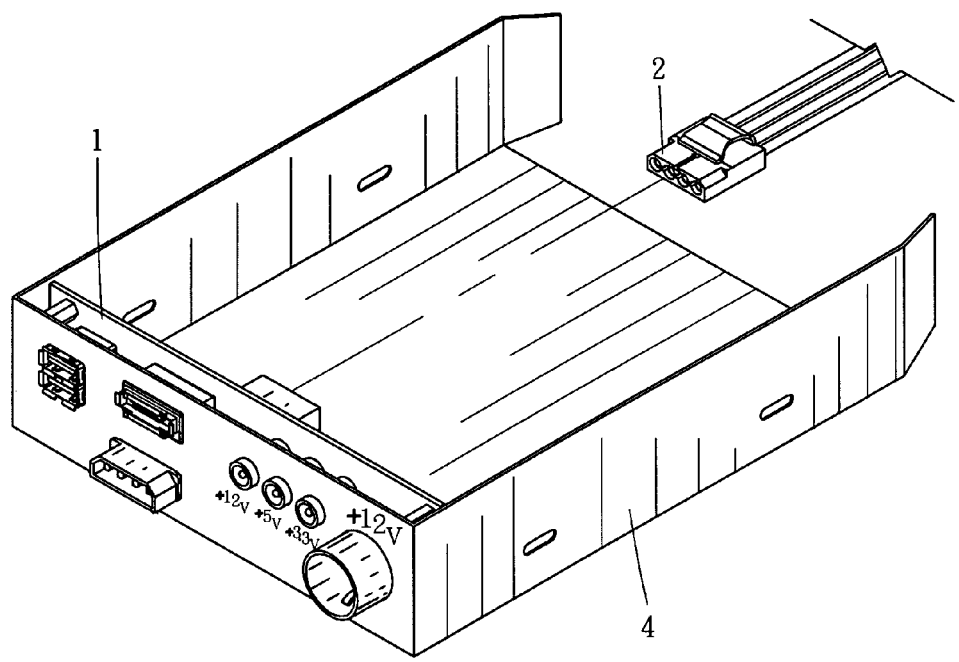
FIG. 5 is a three-dimensional view of the output circuit board affixed on a 5.25 inch hard disk rack in accordance with the present invention.
Figure 6:
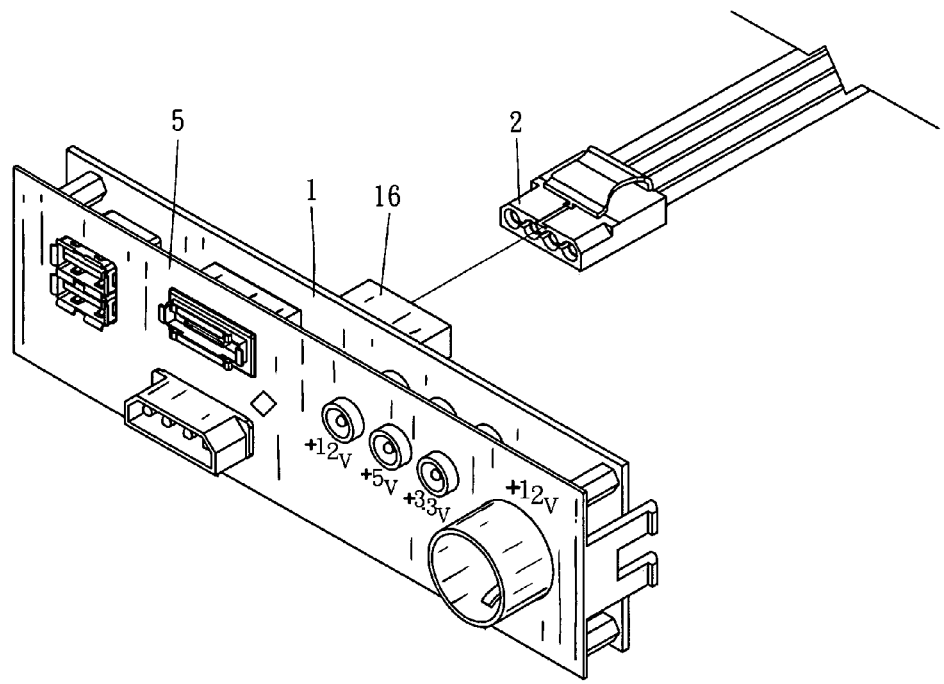
FIG. 6 is a three-dimensional view of the output circuit board affixed on a 5.25 inch covering board in accordance with the present invention.
Figure 7:
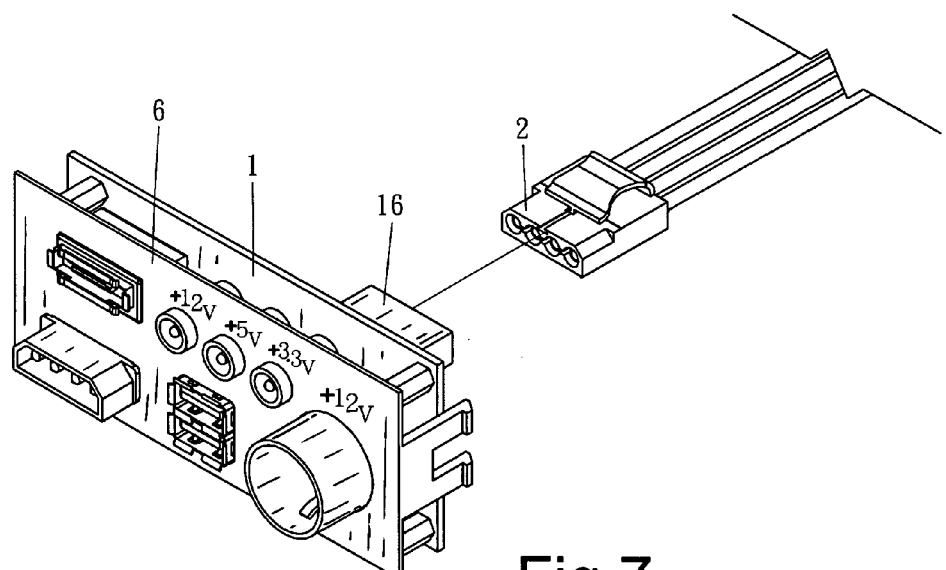
FIG. 7 is a three-dimensional view of the output circuit board affixed on a 3.5 inch covering board in accordance with the present invention.
Figure 8:
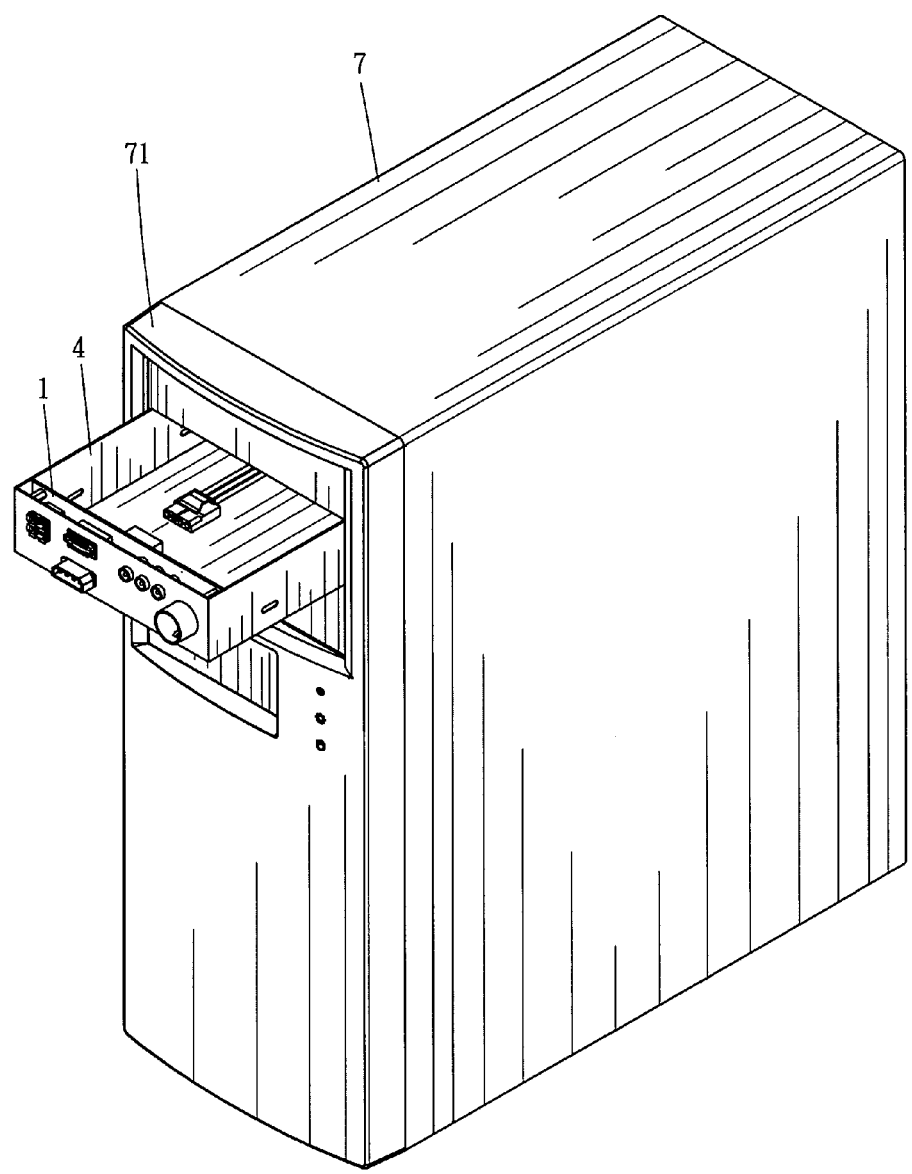
FIG. 8 is a three-dimensional view of the embodiment of FIG. 5 in accordance with the present invention.
Figure 9:
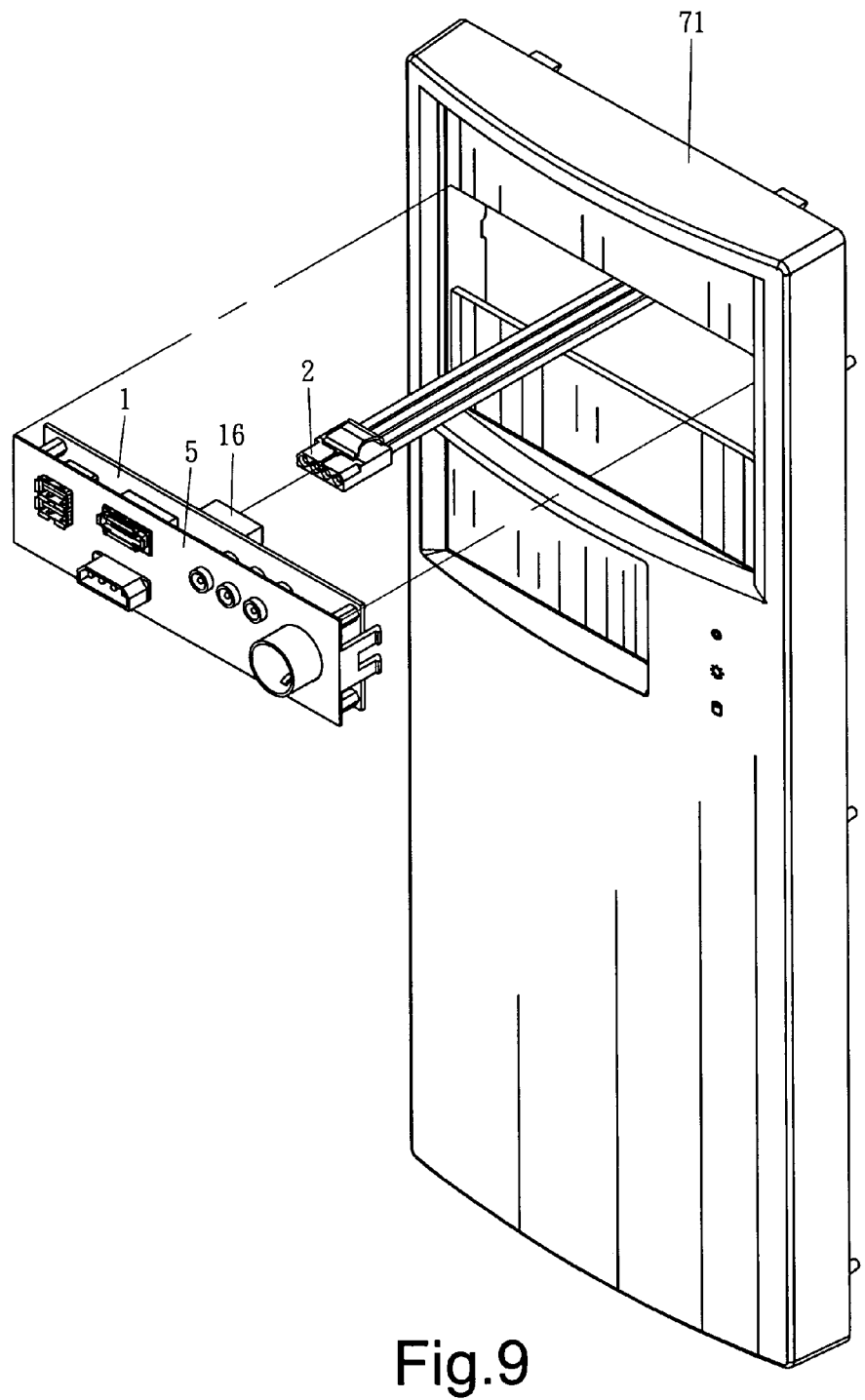
FIG. 9 is a three-dimensional view of the embodiment of FIG. 6 in accordance with the present invention.
Figure 10:
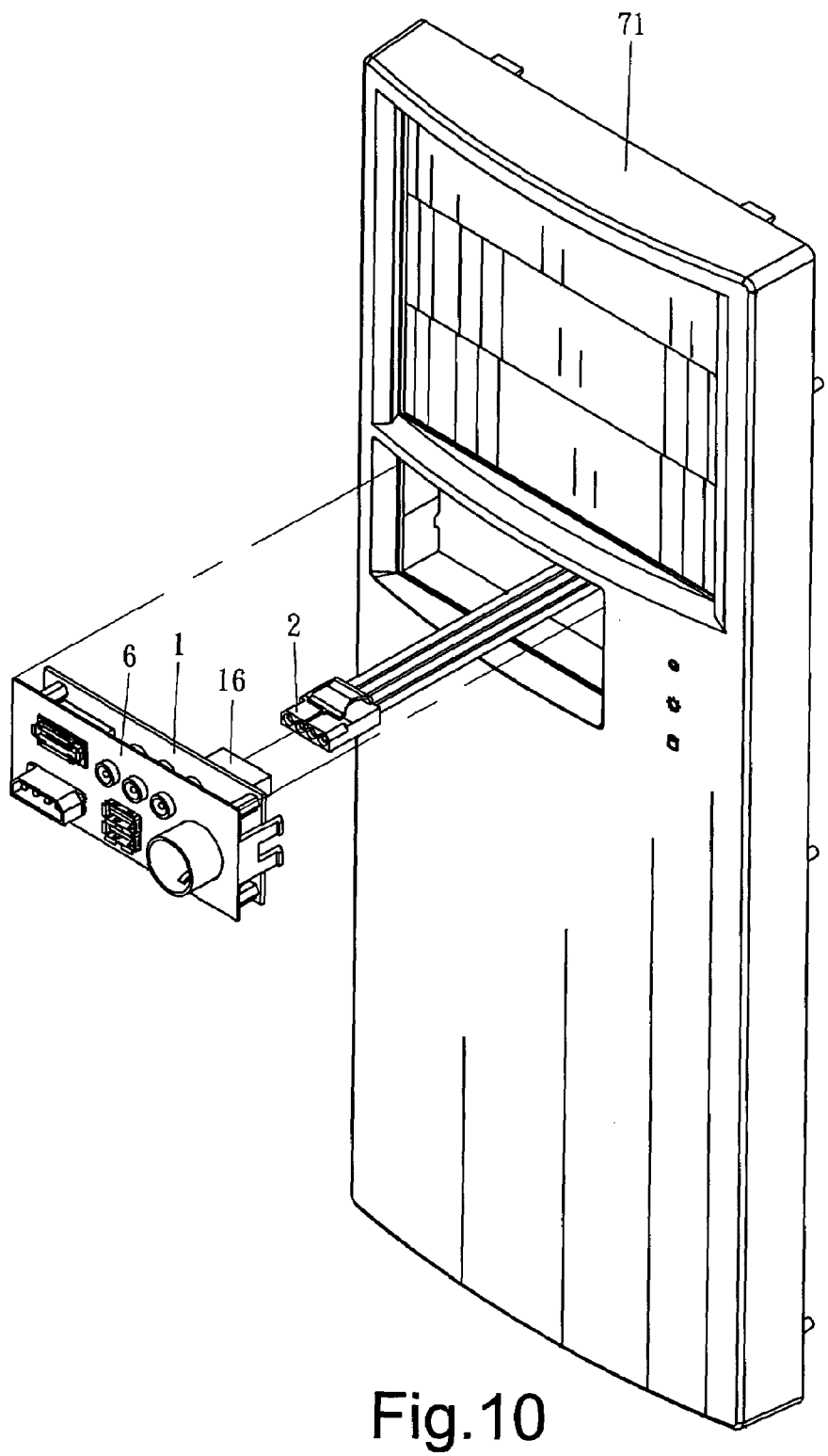
FIG. 10 is a three-dimensional view of the embodiment of FIG. 7 in accordance with the present invention.

As shown in FIGS. 5 to 10, the present invention's output circuit board 1 is provided with a variety of output ends. When implemented, the output circuit board 1 can be affixed on the front edge of a 5.25 inch hard disk rack 4, a 5.25 inch covering board 5, or a 3.5 inch covering board 6, such that it can be affixed on the 5.25 inch hard disk rack 73 or a 3.5 inch hard disk rack 74 on the panel 71 of the computer host 7, as described above.

What is claimed is:

1. A computer direct current power output device, comprising a front surface provided with an output circuit board with various power output ends, the said output circuit board electronically connected to a connecting end of a computer power supply output through a connecting end, thereby allowing the said various output ends on the said output circuit board to provide different direct current powers, and affixing the said output circuit board on an appropriate place on a computer motherboard or a housing for the user to connect the said output end of the said output circuit board and charge or make use of direct current for computer related peripherals, wherein said output end on the said output circuit board is a cigarette ignition output end and at least one output end selected from the group consisting of USB output end, SATA output end, 4P output end, and output end with a plurality of different current values.

2. The computer direct current power output device of claim 1, wherein the said output circuit board with various output ends provided thereon can be affixed on a 5.25 inch hard disk rack, a front edge of a 5.25 inch covering board or a 3.5 inch covering board so as to be affixed on the said 5.25 inch hard disk rack or 3.5 inch hard disk rack of the said computer mother board.

* * * * *